United States Patent
Yan et al.

(10) Patent No.: US 12,518,884 B2
(45) Date of Patent: Jan. 6, 2026

(54) METHOD FOR INTERACTION OF MULTI-PARTY MEDICAL INFORMATION, COMPUTER DEVICE AND STORAGE MEDIUM

(71) Applicant: OUR UNITED CORPORATION, Xi'an (CN)

(72) Inventors: Hao Yan, Xi'an (CN); Zhaoqiang Yang, Xi'an (CN); Jinsheng Li, Xi'an (CN)

(73) Assignee: OUR UNITED CORPORATION, Xi'an (CN)

( * ) Notice: Subject to any disclaimer, the term of this patent is extended or adjusted under 35 U.S.C. 154(b) by 181 days.

(21) Appl. No.: 18/045,365

(22) Filed: Oct. 10, 2022

(65) Prior Publication Data

US 2023/0116325 A1    Apr. 13, 2023

(30) Foreign Application Priority Data

Oct. 8, 2021  (CN) .......................... 202111171755.4

(51) Int. Cl.
*G16H 80/00* (2018.01)
*G16H 10/20* (2018.01)
(Continued)

(52) U.S. Cl.
CPC .............. *G16H 80/00* (2018.01); *G16H 10/20* (2018.01); *G16H 10/60* (2018.01); *G16H 20/00* (2018.01); *G16H 40/20* (2018.01)

(58) Field of Classification Search
CPC ........ G16H 80/00; G16H 40/20; G16H 10/60; G16H 20/00; G16H 10/20
See application file for complete search history.

(56) References Cited

U.S. PATENT DOCUMENTS

| | | | | |
|---|---|---|---|---|
| 11,158,416 B1* | 10/2021 | Sharp | ................ | G16H 50/70 |
| 2014/0330581 A1* | 11/2014 | Billings | ................ | G16H 80/00 |
| | | | | 705/3 |
| 2019/0189293 A1* | 6/2019 | Tse | ................ | G16H 20/10 |

FOREIGN PATENT DOCUMENTS

| | | |
|---|---|---|
| CN | 101620648 A | 1/2010 |
| CN | 102368283 A | 3/2012 |

(Continued)

OTHER PUBLICATIONS

Artificial Intelligence and Multidisciplinary Team Meetings; A Communication Challenge for Radiologists' Sense of Urgency and Position as Spider in a Web? (Year: 2021).*

(Continued)

*Primary Examiner* — Matthew L Hamilton
(74) *Attorney, Agent, or Firm* — Kolitch Romano Dascenzo Gates LLC

(57) ABSTRACT

Provided is a method for interaction of multi-party medical information, a computer device and a storage medium. The method includes: displaying medical statistical data of a target user in a pre-established multi-party consultation group for the target user, wherein the multi-party consultation group includes members of a plurality of medical disciplines associated with the target user and a virtual object; acquiring medical opinions for the target user fed back by the members in the multi-party consultation group; and determining, based on the medical opinions, a medical consultation conclusion for the target user.

16 Claims, 5 Drawing Sheets

- Displaying medical statistical data of a target user in a pre-established multi-party consultation group for the target user — 201
- Acquiring medical opinions for the target user fed back by members in the multi-party consultation group — 202
- Determining, based on the medical opinions, a medical consultation conclusion for the target user through a virtual object — 203

(51) Int. Cl.
  *G16H 10/60* (2018.01)
  *G16H 20/00* (2018.01)
  *G16H 40/20* (2018.01)

(56) References Cited

FOREIGN PATENT DOCUMENTS

| | | |
|---|---|---|
| CN | 105893735 A | 8/2016 |
| CN | 109754886 A | 5/2019 |
| CN | 111028942 A | 4/2020 |
| CN | 111667914 A | 9/2020 |
| CN | 113192631 A | 7/2021 |
| EP | 3852116 A1 | 7/2021 |
| WO | WO2019130265 A1 | 7/2019 |

OTHER PUBLICATIONS

Yan Zhang, Jian Cao, Kunwei Shen, Xiaosong Chen and Siji Zhu, "A Multi-disciplinary Medical Treatment Decision Support System with intelligent treatment recommendation," 2016 2nd IEEE International Conference on Computer and Communications (ICCC), Chengdu, 2016, pp. 838-842, (Year: 2016).*

Qi, Liu; "Rural revitalization, agriculture, rural areas and farmers enter a new era", Beijing: China Development Press, First Edition; Feb. 28, 2019.

\* cited by examiner

Multi-party consultation group (5)

| Name | Gender | Age |

Disease type:

Disease symptoms:

History diagnosis and treatment information:

FIG. 3

METHOD FOR INTERACTION OF MULTI-PARTY MEDICAL INFORMATION, COMPUTER DEVICE AND STORAGE MEDIUM

This application is based on and claims priority to Chinese Patent Application No. 202111171755.4, filed on Oct. 8, 2021, and entitled "METHOD AND APPARATUS FOR INTERACTION OF MULTI-PARTY MEDICAL INFORMATION, COMPUTER DEVICE AND STORAGE MEDIUM", the disclosure of which is herein incorporated by reference in its entirety.

TECHNICAL FIELD

The present disclosure relates to the medical field, and in particular to a method for interaction of multi-party medical information, a computer device, and a storage medium.

BACKGROUND

MDT (multi-disciplinary treatment) is a process in which senior experts from multiple disciplines jointly discuss to formulate personalized diagnosis and treatment plans for patients. It is especially suitable for the diagnosis and treatment of complex diseases such as tumors, renal failure, and heart failure. In an MDT mode, the patient can receive a comprehensive evaluation by an expert team composed of experts in internal medicine, surgery, imaging and related disciplines before treatment, so that a scientific, reasonable and standardized treatment plan is jointly formulated.

SUMMARY

Embodiments of the present disclosure provide a method for interaction of multi-party medical information, a computer device, and a storage medium.

According to some embodiments of the present disclosure, a method for interaction of multi-party medical information is provided. The method for interaction of multi-party medical information includes:
displaying medical statistical data of a target user in a pre-established multi-party consultation group for the target user, wherein the multi-party consultation group includes members of a plurality of medical disciplines associated with the target user and a virtual object;
acquiring medical opinions for the target user fed back by the members in the multi-party consultation group; and
determining, based on the medical opinions, a medical consultation conclusion for the target user through the virtual object.

According to some embodiments of the present disclosure, a computer device is provided, wherein the computer device includes:
one or more processors; and
a memory storing one or more application programs therein;
wherein the one or more processors, when loading and running the one or more application programs, are caused to perform any method for interaction of multi-party medical information in the above method embodiments.

According to some embodiments of the present disclosure, a transitory computer-readable storage medium is provided, wherein the one or more computer programs, when loaded and run by a processor, cause the processor to perform the any method for interaction of multi-party medical information in the above method embodiments.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 3 is a schematic diagram of displaying medical statistical data of a target user according to some embodiments of the present disclosure;

DETAILED DESCRIPTION

Figure 1:
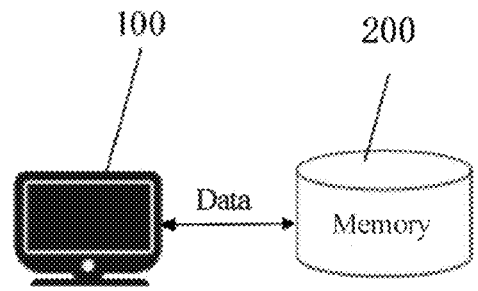
FIG. 1 is a schematic diagram of a scenario of a medical consultation system according to some embodiments of the present disclosure.

The technical solutions in the embodiments of the present disclosure will be clearly and completely described below in conjunction with the accompanying drawings in the embodiments of the present disclosure. It is obvious that the described embodiments are only part but not all of the embodiments of the present disclosure. All other embodiments acquired by those skilled in the art without creative efforts based on the embodiments in the present disclosure are within the protection scope of the present disclosure.

In the descriptions of the embodiments of the present disclosure, it is to be understood that orientation or positional relationships indicated by the terms "center", "longitudinal", "transverse", "length", "width", "thickness", "upper", "lower", "front", "back", "left", "right", "vertical", "horizontal", "top", "bottom", "inside", "outside" etc., are orientation or positional relationships shown on the basis of the drawings, only for the purposes of the ease in describing the present disclosure and simplification of its descriptions, but not indicating or implying that the specified apparatus or element has to be specifically located, and structured and operated in a specific direction, and therefore, should not be understood as limitations to the embodiments of the present disclosure. Moreover, the terms "first" and "second" are only for the purpose of description and should not be construed as indicating or implying relative importance or implicitly indicating the number of technical features indicated. Thus, the features defined by the terms "first" and "second" may include one or more of the features either explicitly or implicitly. In the descriptions of the embodiments of the present disclosure, unless otherwise stated specifically, the term "plurality" means two or more.

In the embodiments of the present disclosure, the word "exemplary" is configured to mean "serving as an example, illustration, or description". Any embodiment described in the embodiments of the present disclosure as "exemplary" is not necessarily to be construed as preferred or advantageous over other embodiments. The following descriptions are presented to enable any person skilled in the art to implement and use the embodiments of the present disclosure. In the following descriptions, details are set forth for the purpose of explanation. It is to be understood that one of ordinary skill in the art can realize that the embodiments of the present disclosure may also be practiced without the use of these specific details. In other examples, well-known structures and procedures have not been described in detail so as not to obscure the descriptions of the embodiments of the present disclosure with unnecessary details. Therefore, the embodiments of the present disclosure are not intended to be limited to the embodiments shown but to accord with the widest scope consistent with the principles and features disclosed in the embodiments of the present disclosure.

It should be noted that since the methods of the embodiments of the present disclosure are executed in a computer device, processing objects of each computer device exist in the form of data or information, such as time, which is essentially time information. It can be understood that in subsequent embodiments, if sizes, numbers, locations, etc., are mentioned, the corresponding data exists for processing by the computer device, which is not repeated in detail here.

The following firstly introduces some basic concepts involved in the embodiments of the present disclosure:

Multi-disciplinary Treatment (MDT): it is a process in which multi-disciplinary senior experts jointly discuss to formulate personalized diagnosis and treatment plans for patients. It is especially suitable for the diagnosis and treatment of complex diseases such as tumors, renal failure, and heart failure. In an MDT mode, the patients can receive a comprehensive evaluation by an expert team composed of experts in internal medicine, surgery, imaging and related disciplines before treatment, so that a scientific, reasonable and standardized treatment plan is jointly formulated.

An agent, as the name suggests, is an entity with intelligence, and the English name is Agent. Based on clouds and with AI (artificial intelligence) as a core, an open intelligent system with three-dimensional perception, global collaboration, accurate judgment and continuous evolution is built. The agent has the following basic properties:

(1) Autonomy: the agent can automatically adjust behaviors and states per se according to changes in an external environment, rather than passively accepting external stimuli, and has the ability of self-management and self-regulation.

(2) Reactive: the agent has the ability of response to the external stimuli.

(3) Proactive: the agent has the ability of initiatively taking actions in response to changes in the external environment.

(4) Social: the agent has the ability of cooperation with other agents or people. Different agents can interact with other agents according to the intentions per se to achieve the purpose of solving problems.

(5) Evolutionary: the agent can accumulate or learn experience and knowledge, and modify behaviors thereof to adapt to a new environment.

Multi-dimensional agent is referred to as multi-agent, the multi-agent is a collection of a plurality of agents, and its goal is to build a large and complex system into small and easily managed systems that communicates and coordinates with each other. Its research involves knowledge, goals, skills and planning of the agent, and how to make the agent take coordinated actions to solve problems. Researchers mainly study the aspects such as interaction and communication, coordination and cooperation, and conflict resolution between the agents, emphasize close group cooperation between the plurality of agents, rather than the autonomy and exertion of individual abilities, and mainly explain how to analyze, design and integrate the plurality of agents to form a cooperative system.

Pareto Optimality, also known as Pareto efficiency, refers to an ideal state of resource allocation, assuming an inherent group of people and allocatable resources, in the change from one allocation state to another allocation state, at least one person becomes better without making the circumstance of anyone worse off, which is Pareto improvement or Pareto optimality.

With the rapid development of technologies, the application of the MDT has become more and more popular, but the current service efficiency of the MDT is not high.

The embodiments of the present disclosure provide a method and an apparatus for interaction of multi-party medical information, a computer device, and a storage medium, which are respectively described in detail below.

Referring to FIG. 1, FIG. 1 is a schematic diagram of a scenario of a medical consultation system according to some embodiments of the present disclosure. The medical consultation system includes a computer device 100. The computer device 100 is integrated with a plurality of apparatuses for interaction of multi-party medical information.

In the embodiments of the present disclosure, the computer device 100 is mainly configured to display medical statistical data of a target user in a pre-established multi-party consultation group for the target user, wherein the multi-party consultation group includes members of a plurality of medical disciplines associated with the target user and a virtual object, acquire medical opinions for the target user fed back by the members in the multi-party consultation group, and determine, based on the medical opinions, a medical consultation conclusion for the target user through the virtual object.

In some embodiments of the present disclosure, the computer device 100 is an independent server, or a server network or server cluster composed of servers. For example, the computer device 100 includes, but is not limited to, a computer, a network host, a single network server, a set of multiple network servers, or a cloud server consisting of multiple servers. The cloud server is composed of a large number of computers or network servers based on cloud computing.

In some embodiments of the present disclosure, the computer device 100 is a terminal, and the terminal is a device including both receiving and transmitting hardware, that is, a device with the receiving and transmitting hardware capable of performing two-way communication on a two-way communication link. Such devices include cellular or other communication devices with a single-line display or a multi-line display or cellular or other communication devices without the multi-line display. The terminal is specifically a desktop terminal, such as a desktop computer.

Those skilled in the art can understand that the application environment shown in FIG. 1 is only one application scenario of the solutions of the present disclosure, and does not constitute a limitation to the application scenarios of the solutions of the present disclosure. Other application environments also include more or fewer computer devices than those shown in FIG. 1. For example, only one computer device is shown in FIG. 1. It is understandable that the medical consultation system also includes one or more other computer devices, which are not specifically limited here.

In addition, as shown in FIG. 1, the medical consultation system further includes a memory 200 for storing medical data, such as user data and history medical data.

It should be noted that the schematic diagram of the scenario of the medical consultation system shown in FIG. 1 is only an example, the medical consultation system and the scenario described in the embodiment of the present disclosure are for the purpose of illustrating the technical solutions of the embodiments of the present disclosure more clearly, and do not constitute a limitation to the technical solutions according to the embodiments of the present disclosure, and those ordinary skilled in the art can know that with evolution of the medical consultation system and emergence of new business scenarios, the technical solutions according to the embodiments of the present disclosure are also applicable to similar technical problems.

The embodiments of the present disclosure provide a method for interaction of multi-party medical information. An execution subject of the method for interaction of multi-party medical information is an apparatus for interaction of multi-party medical information. The apparatus for interaction of multi-party medical information is applied to the computer device. The method for interaction of multi-party medical information includes:

displaying medical statistical data of a target user in a pre-established multi-party consultation group for the target user, wherein the multi-party consultation group includes members of a plurality of medical disciplines associated with the target user and a virtual object; acquiring medical opinions for the target user fed back by the members in the multi-party consultation group; and determining, based on the medical opinions, a medical consultation conclusion for the target user through the virtual object.

Figure 2:
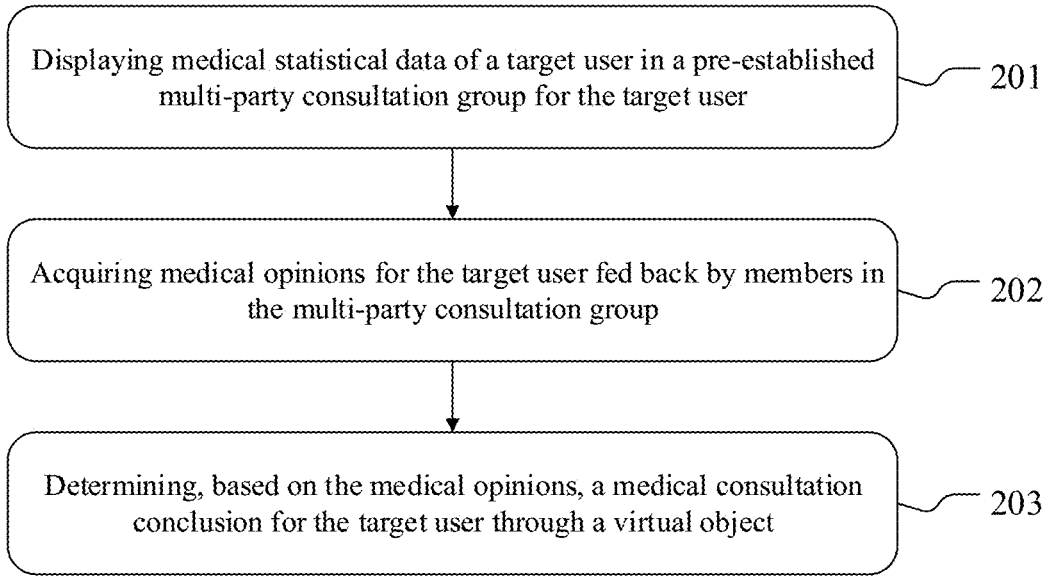
FIG. 2 is a flowchart of a method for interaction of multi-party medical information according to some embodiments of the present disclosure.

As shown in FIG. 2, it is a flowchart of a method for interaction of multi-party medical information in some embodiments of the present disclosure. The method for interaction of multi-party medical information includes the following steps 201 to 203.

In S201, the medical statistical data of the target user is displayed in the pre-established multi-party consultation group for the target user.

The target user is a patient needing multi-party consultation, and the multi-party consultation group includes the members of a plurality of medical disciplines associated with the target user and the virtual object. In some embodiments, the multi-party consultation group further includes the target user, or the target user and personnel related to the target user (for example, relatives of the target user).

Taking the target user needing radiotherapy as an example, the members of the plurality of medical disciplines at least include the members of radiotherapy, surgery, internal medicine, imaging, pathology and other medical disciplines, and at least one member is included for each medical discipline. The multi-party consultation group includes the target user, and further includes other related personnel such as relatives of the target user.

The virtual object may be an agent, such as a multi-dimensional agent or an AI agent. The medical statistical data of the target user is collected in advance, and the medical statistical data of the target user includes user attribute information (including name, age, gender, etc.), disease types, disease symptoms, treatment information, history diagnosis, and treatment conditions, history medication conditions and the like of the target user.

As shown in FIG. 3, the medical statistical data of the target user is displayed in the form of a list or a card. The target user in the multi-party consultation group is "User A", and the medical statistical data of "User A" includes Name, Gender, Age, Disease type, Disease symptoms, and History diagnosis and treatment information.

In S202, the medical opinions for the target user fed back by the members in the multi-party consultation group are acquired.

The multi-party consultation group includes a plurality of members, and each member can express a personal medical opinion for the condition of the target user. For example, assuming that a certain member is a physician, then the physician can express the medical opinion for damage to internal organs caused by the radiotherapy of the target user.

In S203, based on the medical opinions, the medical consultation conclusion for the target user is determined through the virtual object.

According to the embodiments of the present disclosure, the medical statistical data is displayed in the established multi-party consultation group for the user, the virtual object participates in the group, and the medical consultation conclusion for the target user is determined through the virtual object, in this way, the multi-party consultation is performed intelligently, thereby improving efficiency of the multi-party consultation.

In the embodiments of the present disclosure, an interdisciplinary tumor consultation cloud platform (AI-MDT) based on the AI realizes the multi-dimensional AI agent of "moderator+clinical expert+data statistics expert", consultation promotion and interpretation is carried out, and multi-modal iterative interaction with multi-party participating members such as doctors and patients (including the patients and patient relatives) is performed, to promote the MDT to efficiently achieve individualized consultation results. The agent outputs relevant logic and explanations, which further improves the overall cognition of the multi-party consultation. Self-learning and evolutionary characteristics of the agent eventually expand the scope of high-quality medical services, so that high-quality medical services can reach primary medical care.

Generally speaking, in the embodiments of the present disclosure, the virtual object, when capable of acting as a moderator, navigates and guides a discussion direction of the consultation participating members, and the virtual object, when capable of acting as a data statistics expert, fetches and retrieves topics discussed by the consultation participating members and displays corresponding history data; and the virtual object, when acting as a clinical expert, expresses opinions from the perspective of the clinical expert.

Figure 4:
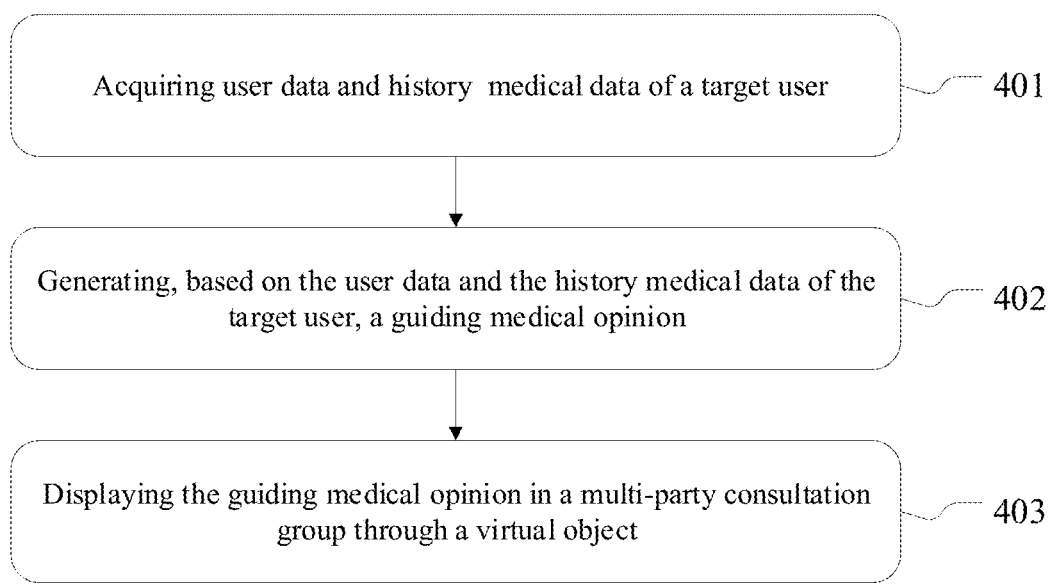
FIG. 4 is a flowchart of another method for interaction of multi-party medical information according to some embodiments of the present disclosure.

The virtual object, when capable of acting as the moderator, guides the discussion direction of the consultation participating members. Specifically, in some embodiments of the present disclosure, as shown in FIG. 4, before acquiring the medical opinions for the target user fed back by the members in the multi-party consultation group (i.e., S202), the method further includes the following steps 401-403.

In S401, user data and history medical data of the target user are acquired.

The user data of the target user includes attribute information of the target user, such as various user attributes of name, gender, age, place of origin, etc. In some embodiments, the tribute information further includes personal habit information such as eating habits and sports hobbies, which are not specifically limited here.

The history medical data includes current symptom information and history treatment data of the target user, for example, the history medical data include medical data of the target user within a preset time period (for example, within the past year) such as hospitalizing data, diagnosis data, medication data, and surgery data, which are not specifically limited here.

In S402, a guiding medical opinion is generated based on the user data and history medical data of the target user.

In some embodiments, generating, based on the user data and the history medical data of the target user, the guiding medical opinion includes: acquiring a target medical field corresponding to the target user; determining a preliminary treatment plan for the target user by querying a preset target medical field database; and generating, based on the preliminary treatment plan for the target user, the guiding medical opinion.

In some embodiments, in addition to the basic user attribute information (including name, age, gender, etc.), the user data of the target user includes disease types, disease symptoms, treatment information, history diagnosis and treatment conditions, history medication conditions and the like of the target user. The target medical field is the medical field of the part corresponding to a disease of the target user, such as liver, kidney, stomach, colon, head, neck, bone tissue, or oral cavity.

The preset target medical field database includes a clinical case database, a field knowledge database, and a medical record information database; the clinical case database is configured to store case data acquired from the traditional inquisition and remote inquisition, and the field knowledge database is configured to store various physiological parameters of a normal human body in professional fields; and the disease information database is configured to store physiological data of typical diseases.

In addition, the preset target medical field database also includes treatment plans in various medical fields formed by integrating the clinical case database, the field knowledge database, and the medical record information database in advance. Multiple treatment plans are included in each medical field.

For example, user A, a 50-year-old male with gastric cancer, adopts treatment plan A and the treatment plan A is recorded in the target medical field database. At this time, the preset target medical field database is queried, the preliminary treatment plan for the target user is determined, that is, in the preset target medical field database, multiple treatment plans in the target medical field are determined, and the preliminary treatment plan for the target user is determined in the multiple treatment plans.

During determining the preliminary treatment plan for the target user in the multiple treatment plans, the treatment plan matched with the most attributes in the user data of the target user in the multiple treatment plans is determined by matching with the user data (including multiple user attributes) of the target user.

For example, the user data of the target user includes age attribute information and gender attribute information, the target user is 60 years old and adopts the treatment plan A. There are multiple positive cases where good treatment results are achieved in the treatment of elderly cases (specifically, a threshold for the number of positive cases is set, for example, the number of positive cases matched with the age attribute (within an age range of the target user) reaches the preset number threshold) stored in the target medical field database, at this time, it can be determined that the treatment plan A is matched with the target user in terms of age attribute.

For another example, the target user is male, and there are multiple positive cases where good treatment results are achieved in the treatment of male cases (similarly, a threshold for the number of positive cases is set, for example, the number of positive cases matched with the gender attribute reaches the preset number threshold) in the target medical field database, at this time, it can be determined that the treatment plan A is matched with the target user in terms of gender attribute.

In some embodiments of the present disclosure, the treatment plan matched with the most user attributes in the user data of the target user in the multiple treatment plans is determined as the most matched treatment plan, which is selected as the preliminary treatment plan for the target user. And the guiding medical opinion is generated based on the preliminary treatment plan for the target user. In some embodiments, the guiding medical opinion is generated in a form of a list or a card.

For example, the target medical field database includes the treatment plan A, treatment plan B, and treatment plan C, in which it is determined that the treatment plan with the most matched user attributes is the treatment plan A, and the most matched treatment plan is the treatment plan A, then the treatment plan A is determined as the preliminary treatment plan for the target user.

It should be noted that the above age attribute and gender attribute in the user data are only examples. It is to be understood that the user data includes more user attributes, such as eating habits and life hobbies of smoking or not, drinking alcohol or not, etc., which are not specifically limited here.

In S403, in the multi-party consultation group, the guiding medical opinion is displayed through the virtual object.

In some embodiments, in the multi-party consultation group, the guiding medical opinion is displayed in a conference group window by means of sending chat information through the virtual object. In some embodiments, the guiding medical opinion is displayed guiding medical opinion in the form of a list or a card in the conference group window.

Before interaction of the multi-party medical information in the embodiments of the present disclosure, the multi-party consultation group needs to be established, so that each member can perform information interaction within the group. Therefore, in some embodiments of the present disclosure, the members of the plurality of medical disciplines include an attending doctor of the target user.

Before displaying the medical statistical data of the target user in the pre-established multi-party consultation group for the target user (i.e., S201), the method further includes: acquiring a multi-party consultation request for the target user initiated by the attending doctor, wherein the request includes member information of at least one medical discipline; sending the multi-party consultation request to members of at least one medical discipline based on the member information of the at least one medical discipline; receiving feedback information of the members of the at least one medical discipline; and establishing the multi-party consultation group for the target user based on the feedback information.

In some embodiments, establishing the multi-party consultation group for the target user based on the feedback information includes: establishing, in response to agreed-to-participate members in the feedback information satisfying a preset multi-party consultation condition in the feedback information, the multi-party consultation group for the target user, wherein the multi-party consultation condition includes a personnel number requirement (for example, at least 5 persons), a multi-disciplinary coverage requirement (at least one person for each of the disciplines such as radiotherapy, surgery, internal medicine, imaging, and pathology), etc.

In some embodiments of the present disclosure, the method further includes: determining, in response to the agreed-to-participate members not satisfying the preset multi-party consultation condition in the feedback information, an unsatisfied medical discipline member condition; determining, based on the unsatisfied medical discipline member condition, standby medical discipline members in a preset medical personnel database; and establishing, based on the standby medical discipline members and the agreed-to-participate members, the multi-party consultation group for the target user.

For example, in the case that there is currently one person agreeing to join the multi-party consultation group in each of the radiotherapy, surgery, internal medicine, and imaging, but the member invited from the pathology does not agree to join, and the pathology personnel is absent, it is determined that the medical discipline member condition is unsatisfied. At this time, the standby medical discipline members are determined by searching information of the pathology personnel in the preset medical personnel database, and the multi-party consultation group for the target user is established based on the standby medical discipline members and the agreed-to-participate members (the standby medical discipline members may also be determined by following an invitation mechanism).

When the virtual object also acts as the data statistics expert, at this time, in some embodiments of the present disclosure, the preliminary treatment plan includes a plurality of treatment node strategies for the target user, before acquiring the medical opinions for the target user fed back by the members in the multi-party consultation group (i.e., S202), the method further includes: determining a discussion priority of the plurality of treatment node strategies; sequentially performing, based on the discussion priority, a target treatment node strategy as currently discussed; acquiring history medical data of the target treatment node strategy; and displaying the history medical data of the target treatment node strategy through the virtual object.

For example, if the preliminary treatment plan includes treatment node 1, treatment node 2, treatment node 3 and treatment node 4, and each treatment node corresponds to a treatment node strategy. The discussion priority of the plurality of treatment node strategies is determined in advance, the determination way is set by default, or the discussion priority is determined randomly. For example, the order of the discussion priority is treatment node 2-treatment node 1-treatment node 4-treatment node 3 in sequence, which means that treatment node 2, treatment node 1, treatment node 4, and treatment node 3 are discussed subsequently.

After determining the discussion priority, assuming that the currently discussed treatment node is the treatment node 1, that is, the treatment node strategy of the treatment node 1 is currently discussed; then the history medical data of the treatment node strategy of the treatment node 1 is acquired, assuming that the treatment node 1 is an image node and an image-related treatment strategy is discussed, the history medical data of the image-related treatment strategy acquired here is, for example, similar image-related implementation strategies and reference factors during treatment of the patient in history treatment plans. At last, the history medical data of the treatment node strategy of treatment node 1 is displayed through the virtual object.

In the embodiments of the present disclosure, the final treatment plan is determined through respective treatment node strategies to further determine a final decision treatment plan, or the final treatment plan is determined by acquiring a plurality of treatment plans, which are described separately below.

(1) The final treatment plan is determined through the determination of respective treatment node strategies.

In some embodiments of the present disclosure, the medical opinions include a target medical opinion of a target member in the members for the target treatment node strategy in the plurality of treatment node strategies.

For example, each member in the multi-party conference group expresses personal medical opinions for the currently discussed target treatment node strategy, wherein the target member expresses the target medical opinion for the target treatment node strategy in the plurality of treatment node strategies, other non-target members feeds personal medical opinions back for the target medical opinion, and then the final opinion of the target treatment node strategy is determined through continuous discussion and integration.

Specifically, determining, based on the medical opinions, the medical consultation conclusion for the target user through the virtual object (i.e., S203) includes: acquiring the feedback opinions of respective members in the multi-party consultation group for the target medical opinion through the virtual object; determining, based on the feedback opinions, a final opinion of the target treatment node strategy; updating, based on the final opinion, the target treatment node strategy in the preliminary treatment plan; and determining the medical consultation conclusion for the target user in response to determining that the plurality of treatment node strategies are updated.

In some embodiments, determining, based on the feedback opinions, the final opinion of the target treatment node strategy includes: acquiring respective feedback opinions which have been acquired currently and fed back by the members; acquiring voting data of respective group members in the multi-party consultation group for respective feedback opinions, and determining, based on the voting data, the final opinion of the target treatment node strategy.

The way of determining, based on the feedback opinions, the final opinion of the target treatment node strategy includes determining the final opinion by means of voting of all members.

For example, respective members votes for the medical opinions fed back by the members, and the final opinion is determined by the minority obeying the majority. If there is a case of the same vote, voting is performed again or one of the opinions is randomly selected as the final opinion.

In the embodiments of the present disclosure, when the target user (or the target user and relatives of the target user) is included in the multi-party consultation group, the target user (or the relatives of the target user) may also express opinions in the multi-party consultation group, and the agent may also considerate.

For example, for the node strategies of cost, treatment ways, and the like, the target user (or the target user and the relatives of the target user) may express opinions for selection, such as selecting a lower price way and a treatment way with less pain, and the agent may also collect the medical opinions expressed by the target user (or the target user and the relatives of the target user). In a specific implementation scenario, the opinions of the target user (or the target user and the relatives of the target user) may be regarded as the medical opinions with the highest priority.

In some embodiments of the present disclosure, after acquiring the feedback opinions of respective members in the multi-party consultation group for the target medical opinion, the method further includes: acquiring prior knowledge of the target treatment node strategy; generating, based on the prior knowledge, an intelligent diagnosis opinion for the target treatment node strategy; and displaying the intelligent diagnosis opinion in the multi-party consultation group through the virtual object.

The prior knowledge of the target treatment node strategy includes a plurality of prior treatment opinions of the target treatment node strategy, and generating, based on the prior knowledge, the intelligent diagnosis opinion for the target treatment node strategy includes selecting part or all of the plurality of prior treatment opinions to generate the intelligent diagnosis opinion for the target treatment node strategy, and the intelligent diagnosis opinion is displayed in the multi-party consultation group through the virtual object.

(2) One decision treatment plan is determined by firstly acquiring a plurality of treatment plans.

In other embodiments of the present disclosure, the medical opinions include opinions fed back by a plurality of members in the multi-party consultation group; on this basis, determining, based on the medical opinions, the medical consultation conclusion for the target user through the virtual object (i.e., S203) includes: determining, based on the opinions fed back by the plurality of members and the preliminary treatment plan, a plurality of treatment plans for the target user, determining a final decision treatment plan in the plurality of treatment plans through the virtual object; and determining, based on the decision treatment plan, the medical consultation conclusion for the target user.

Each member can express different medical opinions for the preliminary treatment plan, and these medical opinions are arranged and combined into a plurality of different treatment plans for the target user. The final decision treatment plan is determined in the plurality of treatment plans through the virtual object, and specifically, the final decision treatment plan is determined in the plurality of treatment plans by means of attribute matching as above, for example, the treatment plan matched with the most user attributes is determined as the final decision treatment plan.

In some embodiments of the present disclosure, determining the final decision treatment plan in the plurality of treatment plans through the virtual object includes: acquiring a plurality of heterogeneous data sources of the treatment plans for the target user, wherein the heterogeneous data sources include positive evidence, negative evidence and neutral evidence; generating, based on the plurality of heterogeneous data sources, a logical link of each treatment plan; and determining, based on the logical link of each treatment plan, the final decision treatment plan through the virtual object.

Generating, based on the plurality of heterogeneous data sources, the logical link of each treatment plan includes: forming a strategy tree of the treatment plans by classifying, based on the plurality of heterogeneous data sources, strategy conflict situations; and generating the logical link of each treatment plan by performing difference graphing on the strategy tree by means of backtracking the strategy tree and performing pattern learning.

Backtracking of the strategy tree is one of the five commonly used algorithm strategies, a core idea thereof is to regard a solution space as the structure of a tree, the path from the root of the tree to one of leaf nodes is a possible solution, and according to a constraint, a solution satisfying the requirements can be acquired. When solving a problem, when it is found that a certain node does not satisfy the solving conditions, "backtracking" is performed to return to try another path. The backtracking method is an optimal search method, and searches forward according to optimal conditions to achieve the goal.

In the embodiments of the present disclosure, in a process of multiple rounds of iterative human-machine dialogues, for typical scenarios such as head hospitals of the same level and hospitals of different levels, the differences in weight distribution of the AI agent in guidance and decision are explored.

For example, in the classification of conflict situations of typical scenarios and the backtracking of the corresponding strategy tree, the strategy tree is subjected to difference graphing, pattern learning is performed, with its ability of extracting nonlinear abstract features of data layer by layer, a piecewise function of reward and punishment factors is established for the positive/negative/neutral evidence of intermediate decision nodes, and the degree of participation of the AI agent (virtual object) in different scenarios is determined.

Further, in the embodiments of the present disclosure, assuming that the virtual object is an AI-MDT multi-agent. At this time, the process of debate+collaboration of the AI-MDT multi-agent is combined with a classic game theory, which exactly studies the conflict and cooperation between rational decision makers.

In the embodiments of the present disclosure, by combining with the game theory, a global cooperative game and local finite-order non-cooperative game model is established; and a strategy-interpretable graph neural network is configured to count global and local effect factors to solve conditions of a Nash equilibrium state.

For example, for a certain effect factor in each target treatment plan, there are often two conflicting directions, specifically, for example, "hope to survive" and "worry about the availability of treatment" coexist. "expect to prolong survival" and "worry about the sustainability of treatment" coexist, "expect to improve quality of life" and "worry about insufficient treatment benefit" coexist, and "hope for cure and recovery" and "worry about metastasis and recurrence" coexist.

From a perspective of the game theory, by taking advanced lung cancer as an example, in the process of receiving targeted therapy of advanced lung cancer patients, the "hope" and "worry" perceived by the patients are like internal game opponents of the patients, including game of "hope to survive" and "worry about the availability of treatment", game of "expect to prolong survival" and "worry about the sustainability of treatment", game of "expect to improve quality of life" and "worry about insufficient treatment benefit", and game of "hope for cure and recovery" and "worry about metastasis and recurrence". Two sides of the game "weigh" external and internal factors, and will eventually reach a balance, that is, a steady state.

In the embodiment of the present disclosure, there is also a game relationship between 20 subcategories, such as: "mindfulness-no expectations", "health and positivity-paying equal attention to distress", "active attention-passive coping", "acquiring professional information-insufficient medical information", "positive emotion-negative emotion", "positive relationship perception-negative relationship perception", "good health perception-poor health perception", "strong treatment compliance behavior-unhealthy behavior", "responsibility perception-weakening ability" and "pressure avoidance-threat perception".

In addition, the inventor also found that the patients have explored some adjustment strategies in order to help internal "hope" to benefit more in the game, for example, "spiritual belief" may be used as an adjustment strategy in the game of "mindfulness-no expectations"; "living in the moment" may be used as an adjustment strategy in the game of "health and positivity-paying equal attention to distress"; "positive thinking" may be used as an adjustment strategy in the game of "active attention-passive coping"; "professional support" may be used as an adjustment strategy in the game of "acquiring professional information-insufficient medical information"; "emotional response" may be used as an adjustment strategy in the game of "positive emotion-negative emotion"; "interpersonal relationship" may be used as an adjustment strategy in the game of "positive relationship perception-negative relationship perception"; "symptom control" may be used as an adjustment strategy in the game of "good health perception-poor health perception"; "expecting to be normal" may be used as an adjustment strategy in the game of "strong treatment compliance behavior-unhealthy behavior"; "empowerment" may be used as an adjustment strategy in the game of "responsibility perception-weakening ability"; and "threat control" may be used as an adjustment strategy in the game of "pressure avoidance-threat perception".

Figure 5:
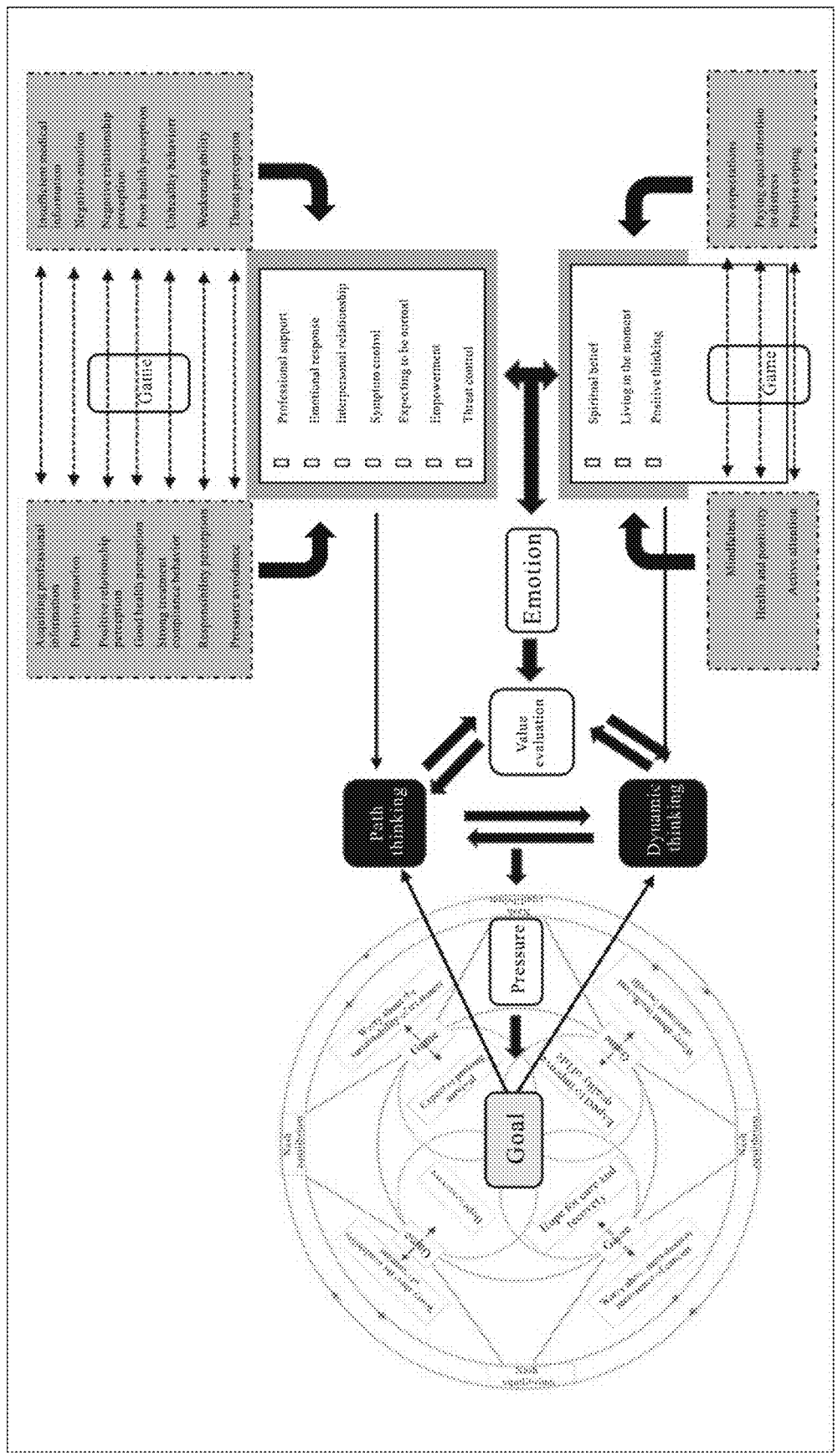
FIG. 5 is a schematic diagram of strategy division according to some embodiments of the present disclosure.

As shown in FIG. 5, in the embodiment of the present disclosure, the "spiritual belief", "living in the moment" and "positive thinking" are summarized into dynamic thinking management strategies, and the "professional support", "emotional response", "interpersonal relationship", "symptom control", "expecting to be normal", "empowerment" and "threat control" are summarized into path thinking management strategies. Dynamic thinking and path thinking work together to adjust hope and achieve an optimal goal in the game of "hope" and "worry", i.e., "hope to survive" and "worry about the availability of treatment" achieve the optimal steady state, "expect to prolong survival" and "worry about the sustainability of treatment" achieve the optimal steady state, "expect to improve quality of life" and "worry about insufficient treatment benefit" achieve the optimal steady state, and "hope for cure and recovery" and "worry about metastasis and recurrence" achieve the optimal steady state.

Specifically, in the embodiment of the present disclosure, the prediction of treatment effects based on (similar cases) is used as the constraint, and an autonomous reinforcement learning-based objective function with multiple parameters (such as patient needs, treatment costs and clinical treatment effects) dynamically accumulated in a time axis is constructed; and in a solution set (Pareto surface), the real optimal solution of the treatment plan, that is, the individualized treatment plan after the compromise of multi-party willingness in several treatment plans for specific patients, is found.

On one hand, in order to achieve the individualized optimal treatment plan on the Pareto surface, with the help of deep learning and reinforcement learning, the first-hand data such as similar medical records, especially postoperative follow-up, is used as training corpus to guide the MDT direction along a "theoretical" best compromise point direction of the Pareto surface. On the other hand, individualized consideration of doctors and an individualized willingness weight of the patients (or the patients and families) in the MDT process are strengthened as an interactive correction to a theoretical value; in the MDT process, at the node of a local phased plan, the AI agent evaluates an overall superiority score of the current plan in short, medium and long terms as a "navigation" criterion for unanimous progress of human participating members, so as to strength the goal of the team.

The embodiments of the present disclosure can realize the objective and rational hosting/navigation of machine agents in precise tumor treatment planning, avoid the adverse effects of subjective factors (such as limited cognition and conflicts of interest) and/or objective factors (such as time constraint and physical and psychological fatigue) on human experts. According to the embodiments, the unique empathy and timely response and innovation abilities of coping with new and complex scenarios of the human experts are learned and maximally motivated; and based on an optimal set of multi-objective optimization, individualized optimal treatment plan planning results are achieved in combination with specific needs of the patients.

In the embodiments of the present disclosure, when the target user is included in the multi-party consultation group, after the optimal treatment plan is acquired, the user is required to confirm in the multi-party consultation group, that is, the optimal treatment plan is displayed in the multi-party consultation group through the virtual object (agent), and a confirmation opinion of the user on the final treatment plan is acquired. If the user does not provide the confirmation opinion, the final treatment plan will be adopted by default as the final treatment plan. It is understandable that in some other embodiments of the present disclosure, a plurality of optimal treatment plans are provided for the user to select and confirm one of the optimal treatment plans, if the user does not provide the confirmation opinion, one treatment plan may be randomly adopted by default as the final treatment plan, or the final treatment plan is achieved by determining a decision treatment plan in the firstly acquired plurality of treatment plans in the above embodiments.

Figure 6:
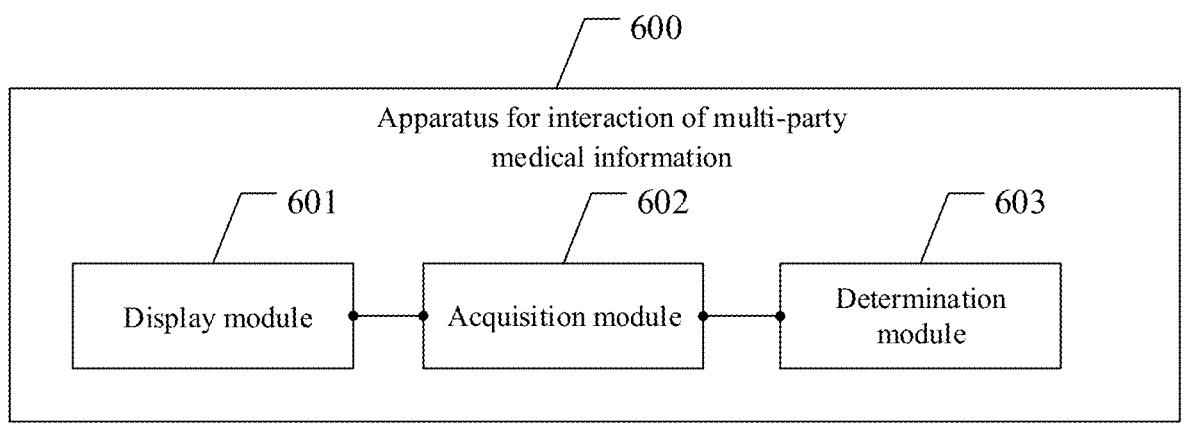
FIG. 6 is a schematic structural diagram of an apparatus for interaction of multi-party medical information according to some embodiments of the present disclosure.

In order to better implement the method for interaction of multi-party medical information in the embodiments of the present disclosure, based on the method for interaction of multi-party medical information, the embodiment of the present disclosure further provides an apparatus for interaction of multi-party medical information, which is applied to a computer device 100 shown in FIG. 1. As shown in FIG. 6, the apparatus for interaction of multi-party medical information 600 includes a display module 601, an acquisition module 602 and a determination module 603.

The display module 601 is configured to display medical statistical data of a target user in a pre-established multi-party consultation group for the target user, wherein the multi-party consultation group includes members of a plurality of medical disciplines associated with the target user and a virtual object;

the acquisition module 602 is configured to acquire medical opinions for the target user fed back by the members in the multi-party consultation group; and the determination module 603 is configured to determine, based on the medical opinions, a medical consultation conclusion for the target user through the virtual object.

According to the embodiments of the present disclosure, the medical statistical data is displayed in the established multi-party consultation group for the user, the virtual object participates in the group, and the medical consultation conclusion for the target user is determined through the virtual object, in this way, the multi-party consultation is performed intelligently, thereby improving the efficiency of the multi-party consultation.

In some embodiments of the present disclosure, the apparatus 600 further includes a guide module, and the guide module is configured to:
  before acquiring the medical opinions for the target user fed back by the members in the multi-party consultation group, acquire user data and history medical data of the target user;
  generate, based on the user data and the history medical data of the target user, a guiding medical opinion; and
  display the guiding medical opinion in the multi-party consultation group through the virtual object.

In some embodiments of the present disclosure, the user data of the target user includes attribute information of the target user, and the history medical data includes current symptom information and history treatment data of the target user;
  the guide module is configured to:
  acquire a target medical field corresponding to the target user;
  determine a preliminary treatment plan for the target user by querying a preset target medical field database; and
  generate, based on the preliminary treatment plan for the target user, the guiding medical opinion.

In some embodiments of the present disclosure, the members of the plurality of medical disciplines include an attending doctor of the target user.

In some embodiments of the present disclosure, the apparatus 600 further includes a group establishment module, and the group establishment module is configured to:
  before displaying the medical statistical data of the target user in the pre-established multi-party consultation group for the target user, acquire a multi-party consultation request for the target user initiated by the attending doctor, wherein the request includes member information of at least one medical discipline;
  send the multi-party consultation request to members of at least one medical discipline based on the member information of the at least one medical discipline;
  receive feedback information of the members of the at least one medical discipline; and
  establish the multi-party consultation group for the target user based on the feedback information.

In some embodiments of the present disclosure, the group establishment module is configured to:
  establish, in response to agreed-to-participate members satisfying a preset multi-party consultation condition in the feedback information, the multi-party consultation group for the target user.

In some embodiments of the present disclosure, the group establishment module is further configured to:
  determine, in response to the agreed-to-participate members not satisfying the preset multi-party consultation condition in the feedback information, an unsatisfied medical discipline member condition;
  determine, based on the unsatisfied medical discipline member condition, standby medical discipline members in a preset medical personnel database; and
  establish, based on the standby medical discipline members and the agreed-to-participate members, the multi-party consultation group for the target user.

In some embodiments of the present disclosure, the preliminary treatment plan includes a plurality of treatment node strategies for the target user; on this basis,
  the display module 601 is further configured to:
  before acquiring the medical opinions for the target user fed back by the members in the multi-party consultation group,
  determine a discussion priority of the plurality of treatment node strategies;
  sequentially perform, based on the discussion priority, a target treatment node strategy as currently discussed;
  acquire history medical data of the target treatment node strategy; and
  display the history medical data of the target treatment node strategy through the virtual object.

In some embodiments of the present disclosure, the medical opinions include a target medical opinion of a target member for the target treatment node strategy in the plurality of treatment node strategies;
  the determination module 603 is configured to:
  acquire feedback opinions of respective members in the multi-party consultation group for the target medical opinion through the virtual object;
  determine, based on the feedback opinions, a final opinion of the target treatment node strategy;
  update, based on the final opinion, the target treatment node strategy in the preliminary treatment plan; and
  determine the medical consultation conclusion for the target user in response to determining that the plurality of treatment node strategies are updated.

In some embodiments of the present disclosure, the apparatus 600 further includes an intelligent diagnosis module, and the intelligent diagnosis module is configured to:
  after acquiring the feedback opinions of respective members in the multi-party consultation group for the target medical opinion, acquire prior knowledge of the target treatment node strategy;
  generate, based on the prior knowledge, an intelligent diagnosis opinion for the target treatment node strategy; and
  display the intelligent diagnosis opinion in the multi-party consultation group through the virtual object.

In some embodiments of the present disclosure, the medical opinions include opinions fed back by a plurality of members in the multi-party consultation group; on this basis,
  the determination module 603 is configured to:
  determine, based on the opinions fed back by the plurality of members and the preliminary treatment plan, a plurality of treatment plans for the target user,
  determine a final decision treatment plan in the plurality of treatment plans through the virtual object; and
  determine, based on the decision treatment plan, the medical consultation conclusion for the target user.

In some embodiments of the present disclosure, the determination module is configured to:
  acquire a plurality of heterogeneous data sources of the treatment plans for the target user, wherein the heterogeneous data sources include positive evidence, negative evidence and neutral evidence;
  generate, based on the plurality of heterogeneous data sources, a logical link of each treatment plan; and
  determine, based on the logical link of each treatment plan, the final decision treatment plan through the virtual object.

The embodiment of the present disclosure further provides a computer device integrated with any apparatus for interaction of multi-party medical information according to the embodiments of the present disclosure, and the computer device includes:
  one or more processors; and
  a memory storing one or more application programs therein;
  the one or more processors, when loading and running the one or more application programs, are caused to perform the method for interaction of multi-party medical information according to any one of the above embodiments of the method for interaction of multi-party medical information.

Figure 7:
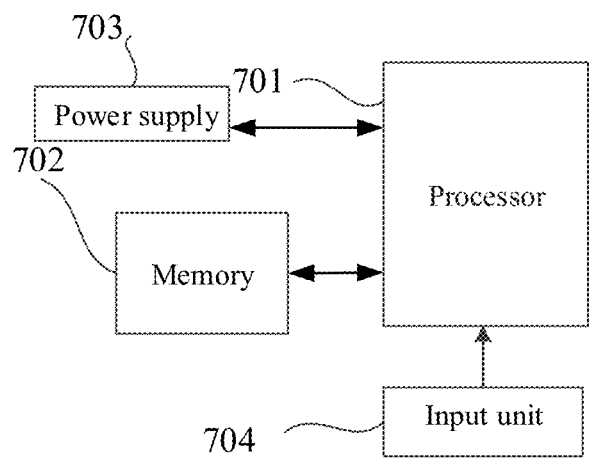
FIG. 7 is a schematic structural diagram of a computer device according to some embodiments of the present disclosure.

The embodiment of the present disclosure further provides a computer device integrated with any apparatus for interaction of multi-party medical information according to the embodiments of the present disclosure. As shown in FIG. 7, it shows a schematic structural diagram of a computer device involved in the embodiment of the present disclosure, specifically:

The computer device may include a processor 701 with one or more processing cores, a memory 702 with one or more computer-readable storage mediums, a power supply 703, an input unit 704 and other components. It can be understood by those skilled in the art that the structure of the computer device shown in FIG. 7 is not a limitation to the computer device. The computer device includes more or less components than those in FIG. 7, a combination of some components or different component layouts.

The processor 701 is a control center of the computer device, and links all portions of the entire computer device by various interfaces and circuits. By running or executing software programs and/or modules stored in the memory 702 and invoking data stored in the memory 702, the processor executes various functions of the computer device and processes the data so as to wholly monitor the computer device. In some embodiments, the processor 701 includes one or more processing cores. In some embodiments, the processor 710 is integrated with an application processor and a modulation and demodulation processor. The application processor mainly processes an operation system, a user interface, an application program, etc. The modulation and demodulation processor mainly processes radio communication. Understandably, the above modulation and demodulation processor may not be integrated into the processor 701.

The memory 702 may be configured to store the software programs and the modules. The processor 701 executes various function applications and data processing by running the software programs and the modules stored in the memory 702. The memory 702 may mainly include a storage program area and a storage data area. The storage program area may store the operation system, the application program required by at least one function (such as an audio playback function and an image playback function), etc. The storage data area may store data and the like built based on the use of the computer device. Moreover, the memory 702 may include a high-speed random-access memory and may further include a nonvolatile memory, such as at least one disk memory device, a flash memory device or other volatile solid state memory devices. Correspondingly, the memory 702 may further include a memory controller to provide access to the memory 702 by the processor 701.

The computer device further includes the power supply 703 for supplying power to all components. In some embodiments, the power supply 703 may be in logic connection to the processor 701 through a power supply management system so as to manage functions such as charging, discharging, and power consumption management through the power supply management system. The power supply 703 may further include any component such as one or more DC or AC power supplies, a recharging system, a power supply failure detection circuit, a power supply converter or inverter and a power supply status indicator.

The computer device may also include the input unit 704, and the input unit 704 may be configured to receive input numeric or character information and to generate a keyboard signal input, a mouse signal input, an operating stick signal input, an optical signal input or a trackball signal input related to user settings and function controls.

Although not shown, the computer device may also include a display unit and the like, which will not be repeated here. Specifically, in the present embodiment, the processor 701 in the computer device loads executable files corresponding to the processes of one or more above application programs into the memory 702 according to the following instructions, and the processor 701 runs the application programs stored in the memory 702, to realizing various functions as follows.

Medical statistical data of a target user is displayed in a pre-established multi-party consultation group for the target user, the multi-party consultation group including members of a plurality of medical disciplines associated with the target user and a virtual object; medical opinions for the target user fed back by the members in the multi-party consultation group are acquired; and based on the medical opinions, a medical consultation conclusion for the target user is determined through the virtual object.

Those ordinary skilled in the art can understand that all or part of the steps in various methods of the above embodiments may be completed by the instructions or by controlling related hardware through the instructions, and the instructions may be stored in a computer-readable storage medium, and loaded and executed by the processor.

To this end, the embodiment of the present disclosure provides a transitory computer-readable storage medium, and the storage medium includes: a read only memory (ROM), a random-access memory (RAM), a magnetic disk or an optical disk, etc. A one or more computer programs are stored therein, and the one or more computer programs, when loaded and run by the processor, cause the processor to perform the method for interaction of multi-party medical information according to the embodiments of the present disclosure. For example, the computer program is loaded and run by the processor to perform the following steps:

displaying medical statistical data of a target user in a pre-established multi-party consultation group for the target user, wherein the multi-party consultation group includes members of a plurality of medical disciplines associated with the target user and a virtual object; acquiring medical opinions for the target user fed back by the members in the multi-party consultation group; and determining, based on the medical opinions, a medical consultation conclusion for the target user through the virtual object.

In the above embodiments, the description of each embodiment has its own emphasis. Parts that are not described in detail in a certain embodiment may refer to the above detailed descriptions of other embodiments, which are not repeated in detail here.

During specific implementation, the above respective units or structures may be implemented as independent entities, or may be freely combined to be implemented as the same or several entities. The specific implementation of the above respective units or structures may refer to the foregoing method embodiments, which are not repeated in detail here.

The specific implementation of the above respective operations may refer to the foregoing embodiments, which are not repeated in detail here.

The method and apparatus for interaction of multi-party medical information, the computer device and the storage medium according to the embodiments of the embodiments of the present disclosure are described in detail above. Specific examples are configured to explain principles and implementations of the embodiments of the present disclosure herein. The descriptions of the above embodiments are only configured to help to understand the method and its core idea of the embodiments of the present disclosure. Meanwhile, for those skilled in the art, there will be changes in the specific implementations and the application scope according to the idea of the embodiments of the present disclosure. In summary, the content of the description should not be understood as a limitation on the embodiments of the present disclosure.

What is claimed is:

1. A method for interaction of multi-party medical information in a medical consultation system, executed on a computing device, the method comprising:

displaying, by a computing device on one or more display screens, medical statistical data of a target patient in a pre-established multi-party consultation group for the target patient, wherein the multi-party consultation group comprises members of a plurality of medical disciplines associated with the target patient and a virtual object, wherein the virtual object is an artificial intelligence agent, and the virtual object is configured to act as at least one of a moderator navigating and guiding a discussion direction of consultation participating members, a data statistics expert fetching and retrieving topics discussed by members of the multi-party consultation group, or a clinical expert expressing opinions;

receiving, by the virtual object executed by the computing device, patient data of the target patient and medical history data of the target patient, wherein the patient data of the target patient comprises attribute information of the target patient, and the medical history data of the target patient comprises current symptom information and treatment history data of the target patient;

accessing, by the virtual object based on the target patient data and the medical history data, a database of treatment plans corresponding to a relevant medical field;

determining a guiding medical opinion comprising one or more relevant preliminary treatment plans from results of a query of the database based on the target patient data and medical history data;

displaying information on the one or more display screens relevant to the guiding medical opinion in the multi-party consultation group through the virtual object;

acquiring from a plurality of the members respective medical opinions for the target patient, wherein the medical opinions comprise opinions fed back by the plurality of members in the multi-party consultation group through a user interface to the virtual object; and determining, by the computing device based on a compilation of the medical opinions, a medical consultation conclusion for the target patient through the virtual object executed by the computing device, wherein determining the medical consultation conclusion comprises:

consolidating, by the virtual object executed by the computing device, the opinions fed back by the plurality of members and the preliminary treatment plan into a plurality of candidate treatment plans for the target patient;

identifying, by the virtual object executed by the computing device, conflicts related to the plurality of candidate treatment plans by acquiring a plurality of heterogeneous data sources of the treatment plans for the target patient, wherein the heterogeneous data sources comprise positive evidence, negative evidence and neutral evidence;

generating, based on the plurality of heterogeneous data sources, a strategy tree comprising the plurality of candidate treatment plans and the related conflicts, wherein each candidate treatment plan is assigned a respective set of logical links in the strategy tree;

determining, by the virtual object executed by the computing device based on the logical links of each candidate treatment plan, a final decision treatment plan by performing a backtracking analysis of the strategy tree; and determining, based on the final decision treatment plan, the medical consultation conclusion for the target patient.

2. The method according to claim 1, wherein the database of treatment plans corresponding to the relevant medical field comprises a clinical case database, a field knowledge database, and a medical record information database; and the clinical case database is configured to store case data acquired from traditional inquisition and remote inquisition, the field knowledge database is configured to store various physiological parameters of a normal human body in professional fields, and the medical record information database is configured to store physiological data of typical diseases.

3. The method according to claim 1, wherein the members of the plurality of medical disciplines comprise an attending doctor of the target patient;

before displaying the medical statistical data of the target patient in the pre-established multi-party consultation group for the target patient, the method further comprises:

acquiring a multi-party consultation request for the target patient initiated by the attending doctor, wherein the request comprises member information of at least one medical discipline;

sending the multi-party consultation request to members of at least one medical discipline based on the member information of the at least one medical discipline;

receiving feedback information of the members of the at least one medical discipline; and establishing the multi-party consultation group for the target patient based on the feedback information.

4. The method according to claim 3, wherein establishing the multi-party consultation group for the target patient based on the feedback information comprises:

establishing, in response to agreed-to-participate members satisfying a preset multi-party consultation condition in the feedback information, the multi-party consultation group for the target patient.

5. The method according to claim 4, wherein the multi-party consultation condition comprises a personnel number requirement and a multi-disciplinary coverage requirement.

6. The method according to claim 4, further comprising:

determining, in response to the agreed-to-participate members not satisfying the preset multi-party consultation condition in the feedback information, an unsatisfied medical discipline member condition;

determining, based on the unsatisfied medical discipline member condition, standby medical discipline members in a preset medical personnel database; and establishing, based on the standby medical discipline members and the agreed-to-participate members, the multi-party consultation group for the target patient.

7. The method according to claim 1, wherein the preliminary treatment plan comprises a plurality of treatment node strategies for the target patient;
before acquiring the medical opinions for the target patient fed back by the members in the multi-party consultation group, the method further comprises:
determining a discussion priority of the plurality of treatment node strategies;
sequentially performing, based on the discussion priority, a target treatment node strategy as currently discussed;
acquiring history medical data of the target treatment node strategy; and
displaying the history medical data of the target treatment node strategy through the virtual object.

8. The method according to claim 7, wherein the medical opinions comprise a target medical opinion of a target member for the target treatment node strategy in the plurality of treatment node strategies;
determining, based on the medical opinions, the medical consultation conclusion for the target patient through the virtual object comprises:
acquiring feedback opinions of respective members in the multi-party consultation group for the target medical opinion through the virtual object;
determining, based on the feedback opinions, a final opinion of the target treatment node strategy;
updating, based on the final opinion, the target treatment node strategy in the preliminary treatment plan; and
determining the medical consultation conclusion for the target patient in response to determining that the plurality of treatment node strategies are updated.

9. The method according to claim 8, wherein determining, based on the feedback opinions, the final opinion of the target treatment node strategy comprises:
acquiring respective feedback opinions which have been acquired currently and fed back by the members;
acquiring voting data of respective group members in the multi-party consultation group for the respective feedback opinions; and
determining, based on the voting data, the final opinion of the target treatment node strategy.

10. The method according to claim 8, wherein after acquiring the feedback opinions of respective members in the multi-party consultation group for the target medical opinion through the virtual object, the method further comprises:
acquiring prior knowledge of the target treatment node strategy;
generating, based on the prior knowledge, an intelligent diagnosis opinion for the target treatment node strategy; and
displaying the intelligent diagnosis opinion in the multi-party consultation group through the virtual object.

11. The method according to claim 10, wherein the prior knowledge of the target treatment node strategy comprises a plurality of prior treatment opinions of the target treatment node strategy, and generating, based on the prior knowledge, the intelligent diagnosis opinion for the target treatment node strategy comprises:
selecting part or all of the plurality of prior treatment opinions to generate the intelligent diagnosis opinion for the target treatment node strategy.

12. The method according to claim 1, wherein generating, based on the plurality of heterogeneous data sources, the strategy tree comprising the set of logical links of each candidate treatment plan comprises:
forming the strategy tree of the treatment plans by classifying strategy conflict situations based on the plurality of heterogeneous data sources; and
generating the set of logical links of each treatment plan by performing difference graphing on the strategy tree by backtracking the strategy tree and performing pattern learning.

13. The method according to claim 1, wherein the medical statistical data of the target patient comprises at least one of patient attribute information, disease types, disease symptoms, treatment information, history diagnosis and treatment conditions, or history medication conditions.

14. The method according to claim 1, wherein displaying the medical statistical data of the target patient comprises displaying the medical statistical data of the target patient in a form of a list.

15. A computer device, comprises:
one or more processors; and
a memory storing one or more application programs therein;
wherein the one or more processors, when loading and running the one or more application programs, are caused to perform:
displaying, by a computing device on one or more display screens, medical statistical data of a target patient in a pre-established multi-party consultation group for the target patient, wherein the multi-party consultation group comprises members of a plurality of medical disciplines associated with the target patient and a virtual object, wherein the virtual object is an artificial intelligence agent, and the virtual object is configured to act as at least one of a moderator navigating and guiding a discussion direction of consultation participating members, a data statistics expert fetching and retrieving topics discussed by members of the multi-party consultation group, or a clinical expert expressing opinions;
receiving, by the virtual object executed by the computing device, patient data of the target patient and medical history data of the target patient, wherein the patient data of the target patient comprises attribute information of the target patient, and the medical history medical data of the target patient comprises current symptom information and history treatment history data of the target patient;
accessing, by the virtual object, based on the target patient data and the medical history data, a database of treatment plans corresponding to a relevant medical field;
determining a guiding medical opinion comprising one or more relevant preliminary treatment plans from results of a query of the database based on the target patient data and the medical history data;
displaying information on the one or more display screens relevant to the guiding medical opinion in the multi-party consultation group through the virtual object;
acquiring from a plurality of the members respective medical opinions for the target patient, wherein the medical opinions comprise opinions fed back by the plurality of members in the multi-party consultation group through a user interface to the virtual object; and
determining, by the computing device based on a compilation of the medical opinions, a medical consultation conclusion for the target patient through the virtual object executed by the computing device, wherein determining the medical consultation conclusion comprises:
consolidating, by the virtual object executed by the computing device, the opinions fed back by the plurality of members and the preliminary treatment plan into a plurality of candidate treatment plans for the target patient;
identifying, by the virtual object executed by the computing device, conflicts related to the plurality of candidate treatment plans by acquiring a plurality of heterogeneous data sources of the treatment plans for the target patient, wherein the heterogeneous data sources comprise positive evidence, negative evidence and neutral evidence;
generating, based on the plurality of heterogeneous data sources, a strategy tree comprising the plurality of candidate treatment plans and the related conflicts, wherein each candidate treatment plan is assigned a respective set of logical links in the strategy tree;
determining, by the virtual object executed by the computing device based on the logical links of each candidate treatment plan, a final decision treatment plan by performing a backtracking analysis of the strategy tree; and
determining, based on the final decision treatment plan, the medical consultation conclusion for the target patient.

16. A non-transitory computer-readable storage medium storing one or more computer programs therein, wherein the one or more computer programs, when loaded and run by a processor, cause the processor to perform:
displaying, by a computing device on one or more display screens, medical statistical data of a target patient in a pre-established multi-party consultation group for the target patient, wherein the multi-party consultation group comprises members of a plurality of medical disciplines associated with the target patient and a virtual object, wherein the virtual object is an artificial intelligence agent, and the virtual object is configured to act as at least one of a moderator navigating and guiding a discussion direction of consultation participating members, a data statistics expert fetching and retrieving topics discussed by members of the multi-party consultation group, or a clinical expert expressing opinions;
receiving, by the virtual object executed by the computing device, patient data of the target patient and medical history medical data of the target patient, wherein the patient data of the target patient comprises attribute information of the target patient, and the medical history medical data of the target patient comprises current symptom information and history treatment history data of the target patient;
accessing, by the virtual object based on the target patient data and the medical history data, a database of treatment plans corresponding to a relevant medical field;
determining a guiding medical opinion comprising one or more relevant preliminary treatment plans from results of a query of the database based on the target patient data and the medical history data;
displaying information on the one or more display screens relevant to the guiding medical opinion in the multi-party consultation group through the virtual object;
acquiring from a plurality of the members respective medical opinions for the target patient, wherein the medical opinions comprise opinions fed back by the plurality of members in the multi-party consultation group through a user interface to the virtual object; and
determining, by the computing device based on a compilation of the medical opinions, a medical consultation conclusion for the target patient through the virtual object executed by the computing device, wherein determining the medical consultation conclusion comprises:
consolidating, by the virtual object executed by the computing device, the opinions fed back by the plurality of members and the preliminary treatment plan into a plurality of candidate treatment plans for the target patient;
identifying, by the virtual object executed by the computing device, conflicts related to the plurality of candidate treatment plans by acquiring a plurality of heterogeneous data sources of the treatment plans for the target patient, wherein the heterogeneous data sources comprise positive evidence, negative evidence and neutral evidence;
generating, based on the plurality of heterogeneous data sources, a strategy tree comprising the plurality of candidate treatment plans and the related conflicts, wherein each candidate treatment plan is assigned a respective set of logical links in the strategy tree;
determining, by the virtual object executed by the computing device based on the logical links of each candidate treatment plan, a final decision treatment plan by performing a backtracking analysis of the strategy tree; and
determining, based on the final decision treatment plan, the medical consultation conclusion for the target patient.

* * * * *